US011778519B2

(12) United States Patent
Berger et al.

(10) Patent No.: US 11,778,519 B2
(45) Date of Patent: Oct. 3, 2023

(54) WIRELESS COMMUNICATION WITH NON-PUNCTURED SYMBOLS

(71) Applicant: QUALCOMM Incorporated, San Diego, CA (US)

(72) Inventors: Peer Berger, Hod Hasharon (IL); Shay Landis, Hod Hasharon (IL); Moshe Ben-Ari, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/060,952

(22) Filed: Dec. 1, 2022

(65) Prior Publication Data

US 2023/0095017 A1    Mar. 30, 2023

Related U.S. Application Data

(62) Division of application No. 16/705,067, filed on Dec. 5, 2019, now Pat. No. 11,540,178.

(51) Int. Cl.
*H04W 28/26* (2009.01)
*H04W 4/40* (2018.01)
*H04L 5/00* (2006.01)
*H04L 5/10* (2006.01)
*H04W 52/52* (2009.01)
(Continued)

(52) U.S. Cl.
CPC ............ *H04W 28/26* (2013.01); *H04L 5/0051* (2013.01); *H04L 5/10* (2013.01); *H04W 4/40* (2018.02); *H04W 52/52* (2013.01); *H04W 72/0446* (2013.01); *H04W 92/18* (2013.01)

(58) Field of Classification Search
CPC ....... H04W 28/26; H04W 4/40; H04W 52/52; H04W 72/0446; H04W 92/18; H04L 5/0051; H04L 5/10
See application file for complete search history.

(56) References Cited

U.S. PATENT DOCUMENTS

2019/0364585 A1  11/2019  Lee et al.
2021/0391894 A1  12/2021  Yu et al.

OTHER PUBLICATIONS

CATT: "Physical Layer Structure for NR Sidelink", 3GPP TSG RAN WG1 Meeting #99, 3GPP Draft; R1-1912153, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 18, 2019-Nov. 22, 2019, Nov. 9, 2019 (Nov. 9, 2019), 22 Pages, XP051823234, Section 4.3, Section 8, Proposal 32, Section 4.1 2-stage SCI contents.

(Continued)

*Primary Examiner* — Eric Myers
(74) *Attorney, Agent, or Firm* — Procopio, Cory, Hargreaves & Savitch LLP

(57) ABSTRACT

A transmitting device maps complex valued symbols in sequence to physical resource blocks for a sidelink transmission. The transmitting device reserves a first symbol of a subframe, where resource elements in the first symbol of the subframe are not considered in mapping the complex valued symbols to the physical resource blocks for the sidelink transmission. The transmitting device transmits the sidelink transmission after mapping the complex valued symbols to the physical resource blocks. A receiving device receives the sidelink transmission and decodes the sidelink transmission to determine complex valued symbols that are mapped in sequence to physical resource blocks of the sidelink transmission, where the complex valued symbols are not mapped to resource elements in a first symbol of a subframe.

20 Claims, 12 Drawing Sheets

(51) Int. Cl.
 *H04W 72/0446* (2023.01)
 *H04W 92/18* (2009.01)

(56) References Cited

OTHER PUBLICATIONS

International Search Report and Written Opinion—PCT/US2020/063024—ISA/EPO—dated Mar. 10, 2021.

WIRELESS COMMUNICATION WITH NON-PUNCTURED SYMBOLS

CROSS REFERENCE TO RELATED APPLICATION(S)

This application is a Divisional of U.S. Non-provisional application Ser. No. 16/705,067, entitled "WIRELESS COMMUNICATION WITH NON-PUNCTURED SYMBOLS" and filed on Dec. 5, 2019, which is expressly incorporated by reference herein in its entirety.

BACKGROUND

Technical Field

The present disclosure relates generally to communication systems, and more particularly, to vehicle-to-everything (V2X) or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X or other D2D communication. There exists a need for further improvements in V2X or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for a transmitting device. The apparatus maps complex valued symbols in sequence to physical resource blocks for a sidelink transmission. The apparatus reserves a first symbol of a subframe, where resource elements in the first symbol of the subframe are not considered in mapping the complex valued symbols to the physical resource blocks for the sidelink transmission. Then, the apparatus transmits the sidelink transmission after mapping the complex valued symbols to the physical resource blocks. In an example, the sidelink transmission may include a of a physical sidelink shared channel (PSSCH). In another example, the sidelink transmission may include a physical sidelink control channel (PSCCH).

In an aspect of the disclosure, a method, a computer-readable medium, and an apparatus are provided for a receiving device. The apparatus receives the sidelink transmission and decodes the sidelink transmission to determine complex valued symbols that are mapped in sequence to physical resource blocks of the sidelink transmission, where the complex valued symbols are not mapped to resource elements in a first symbol of a subframe. In an example, the sidelink transmission may include a of a PSSCH. In another example, the sidelink transmission may include a PSCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
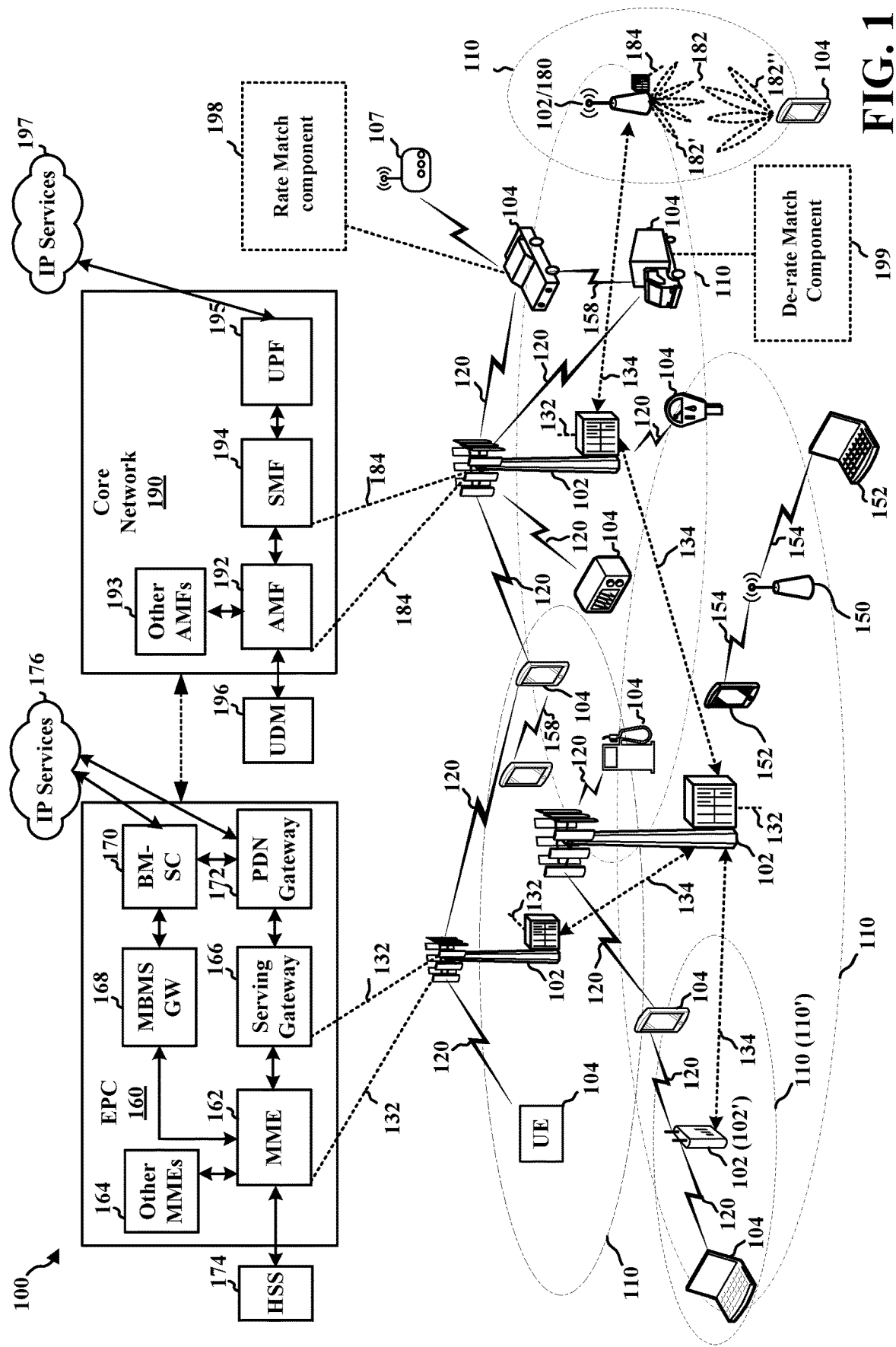
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A first symbol of a sidelink subframe may be used by a receiver for automatic gain control (AGC). The receiver may set its LLRs to zero at the beginning of the subframe or during a first symbol of the subframe. The receiving UE may not receive information transmitted during the first symbol of a sidelink subframe thereby causing performance degradation that may be similar to puncturing of the first symbol. In order to avoid such performance degradation, the present disclosure provides for the transmitter to avoid including information in the first symbol of a subframe. If information is not included in the first symbol, the receiver does not fail to receive the information due to AGC. The present disclosure provides for a transmitting device to map a physical sidelink shared channel (PSSCH) or a physical sidelink control channel (PSCCH) to resource elements of a subframe without considering the first symbol of the subframe in the mapping process. Therefore, the transmitting device may rate match the PSSCH/PSCCH to exclude PSCCH/PSSCH from the first symbol Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. V2X communication may include cellular-vehicle-to-everything (C-V2X) communication. Referring again to FIG. 1, in some aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. V2X communication or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X or other D2D communication in connection with LTE the concepts described herein may be applicable to other similar areas, such as 5G NR, LTE-A, CDMA, GSM, and other wireless technologies.

Referring again to FIG. 1, in some aspects, a transmitting device, such as a UE 104, may include a rate match component 198 that is configured to map complex valued symbols in sequence to physical resource blocks for a sidelink transmission, where resource elements in the first symbol of the subframe are not considered in mapping the complex valued symbols to the physical resource blocks for the sidelink transmission. A receiving device, such as another UE 104, may include a de-rate match component 199 configured to decode a sidelink transmission from a transmitting device to determine complex valued symbols that are mapped in sequence to physical resource blocks of the sidelink transmission, where the complex valued symbols are not mapped to resource elements in a first symbol of a subframe. Rate matching may be applied to the last symbol of the subframe in addition to the first symbol of the subframe. Although the example is described for a UE 104 as the transmitting device and another UE as the receiving device, aspects may be similarly applied for other devices, such as RSU 107, etc., that may communicate based on sidelink.

Figure 2:
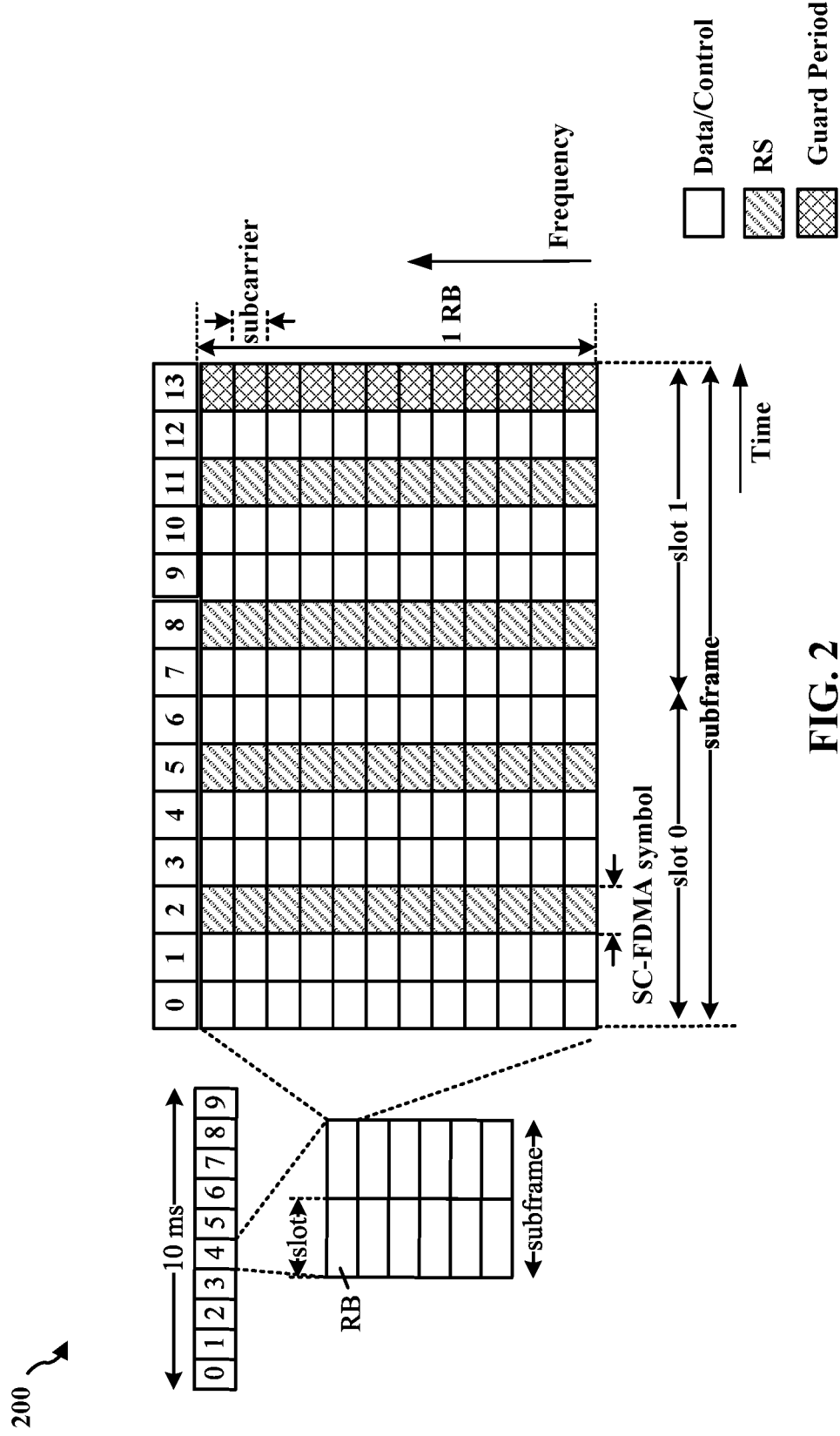
FIG. 2 illustrates example aspects of a sidelink frame structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

Figure 3:
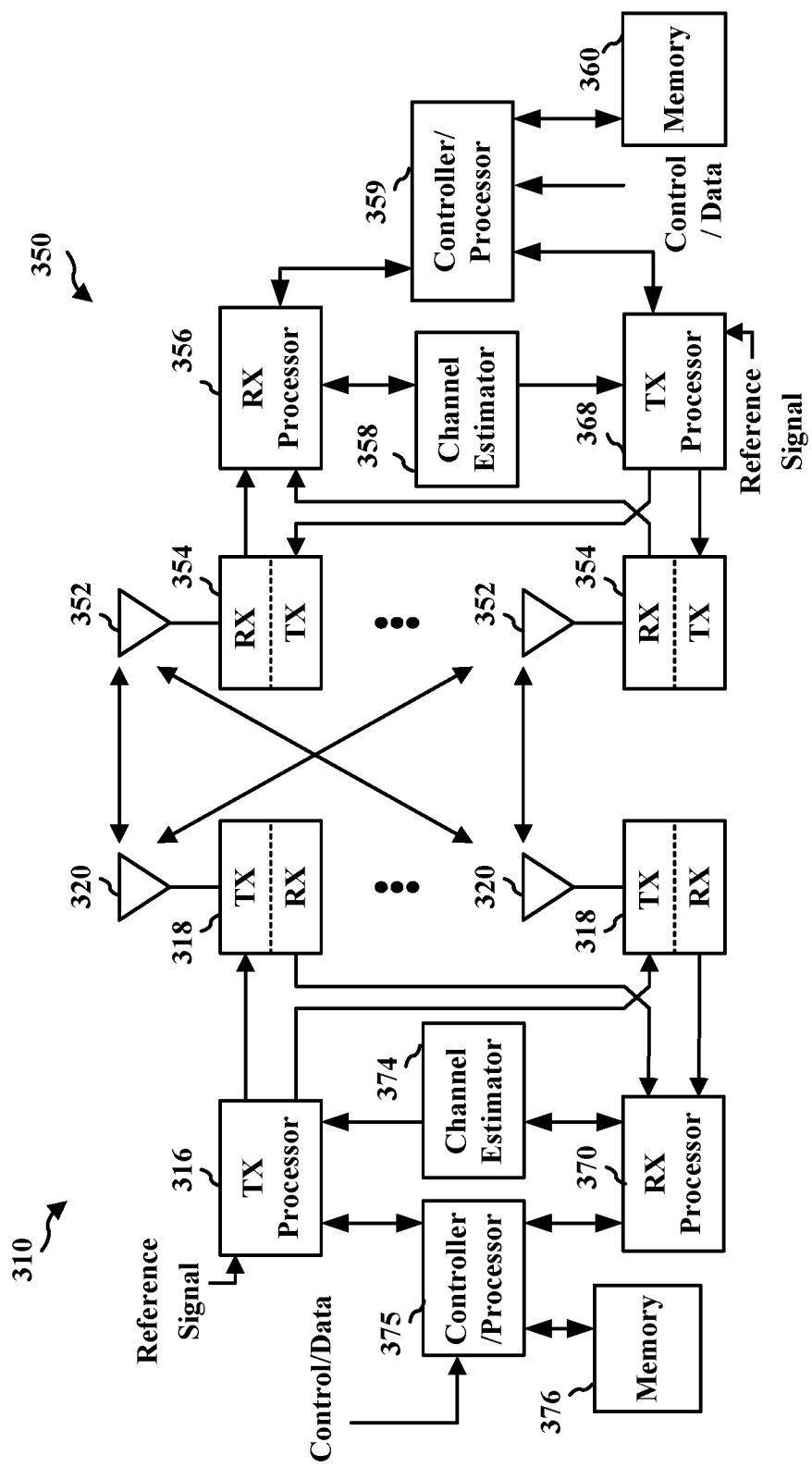
FIG. 3 is a diagram illustrating an example of a first device and a second device involved in wireless communication based, e.g., on V2X or other D2D communication.

FIG. 3 is a block diagram 300 of a first wireless communication device 310 in communication with a second wireless communication device 350. The device 310 may comprise a transmitting device communicating with a receiving device, e.g., device 350, via V2X or other D2D communication. For example, the communication may include C-V2X communication The communication may be based, e.g., on sidelink. The devices 310 and 350 may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 and/or 199 of FIG. 1.

Sidelink transmissions may be organized into radio frames with a duration of a number of slots. For example, each radio frame may include 20 slots. A sidelink subframe may include two consecutive slots, e.g., starting with an even-numbered slot. A physical channel or signal that is transmitted in a slot may be described by a resource grid of subcarriers and SC-FDMA symbols. Each element in the resource grid may be referred to as a resource element.

Figure 4:
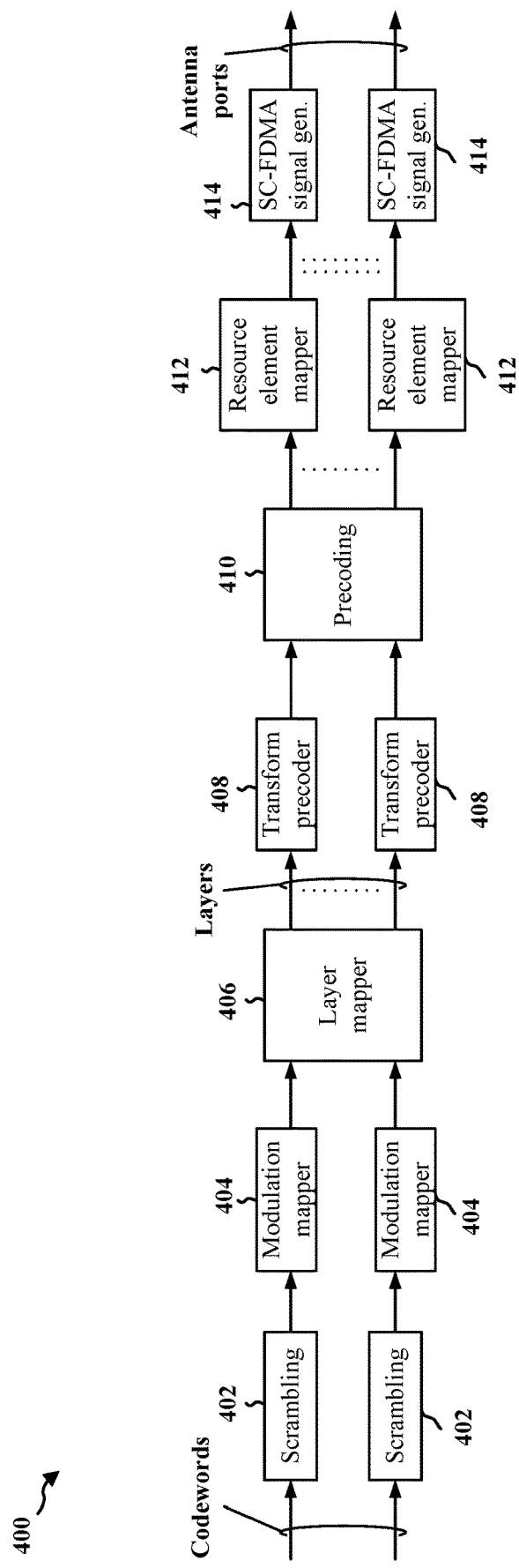
FIG. 4 is an example overview of physical channel processing for baseband signal generation.

FIG. 4 illustrates an example overview of physical channel processing 400 for baseband signal generation. The baseband signal generation may be used to generate sidelink physical channels, such as PSSCH, PSCCH, PSDCH, or PSBCH. The baseband signal generation may include scrambling of codewords, as illustrated at 402. For example, a block of bits for transmission on a PSSCH or PSCCH in a subframe may be scrambled prior to modulation. The scrambling sequence generator may be initialized at the start of each PSSCH subframe, for example. The scrambled bits may be modulated by the modulation mapper(s) 404 to generate a block of complex-valued symbols. Example modulation schemes may include QPSK, 16 QAM, 64 QAM, etc. A layer mapper 406 may map the complex-valued modulation symbols onto one or more transmission layers. The layer mapping may be performed assuming a single antenna port. Transform precoder(s) 408 may apply transform precoding to generate complex-valued symbols. For example, a block of complex-valued symbols may be divided into sets, each set corresponding to one SC-FDMA symbol. Then, transform precoding may be applied resulting in a block of complex valued symbols. A precoder 410 may perform precoding of the complex-valued symbols. Precoding may be performed assuming a single antenna port. The precoder 410 may receive a block of vectors from the transform precoder 408 and generate a block of vectors to be mapped onto resource elements. Then, the block of precoded complex valued symbols may be mapped in sequence to physical resource blocks, e.g., to resource elements, by the resource element mapper(s) 412. The precoded complex-valued symbols may be mapped in order to physical resource blocks that are assigned for transmission and not used for transmission of reference signals. Then, at 414, the complex-value time-domain SC-FDMA signal may be generated for transmission at antenna port(s) based on the mapped resource elements.

Figure 5A:
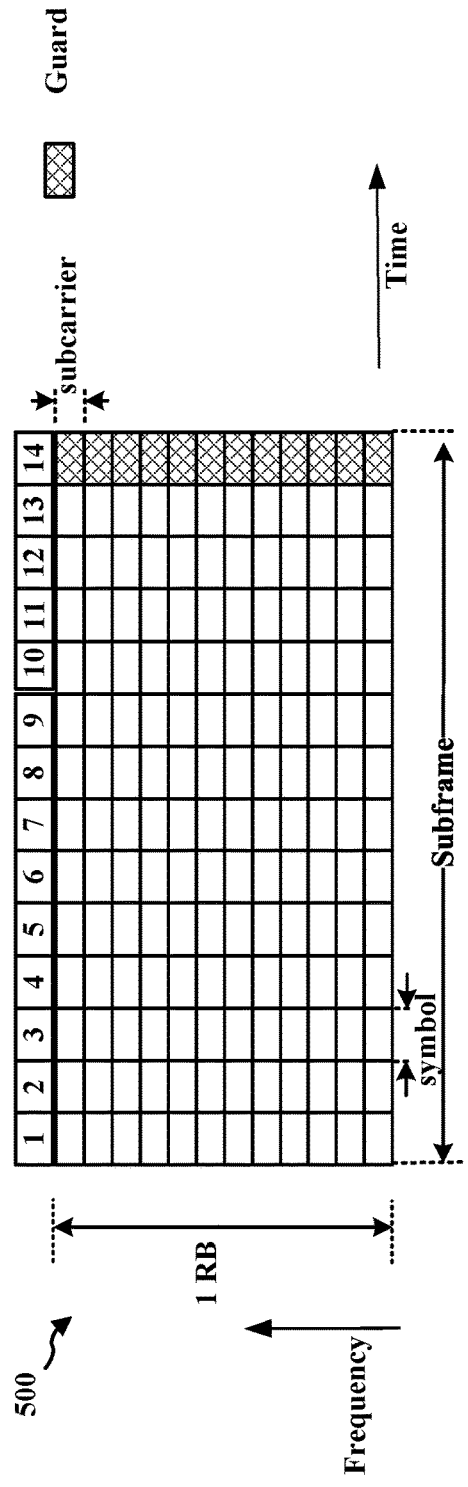
FIGS. 5A and 5B illustrates examples of sidelink subframes.

FIG. 5A illustrates an example sidelink subframe 500 including 14 symbols. The symbols may be SC-FDMA symbols, for example. As illustrated in FIG. 5A, the last symbol of the sidelink subframe 500 may serve as a guard period that is not used for sidelink transmissions. Thus, PSSCH/PSCCH is not transmitted or received in the last symbol of the subframe. The last symbol may be reserved, e.g., for switching between transmission and reception. In some examples, the last symbol of a subframe may be punctured, e.g., the resource elements in the last symbol within a subframe may be counted in a mapping process (e.g., performed by the resource element mapper 412 in FIG. 4) but not transmitted. Puncturing PSSCH/PSCCH may lead to performance degradation. In other examples, rate matching may be applied to a sidelink transmission while avoiding transmission/reception in a last symbol within a subframe. For example, the resource elements in the last symbol within the subframe may not be considered in the mapping process for the transmission. A UE may determine whether to puncture or rate match a transmission at the last symbol of a subframe based on a transmission format, e.g., a transmission format of SCI.

Figure 5B:
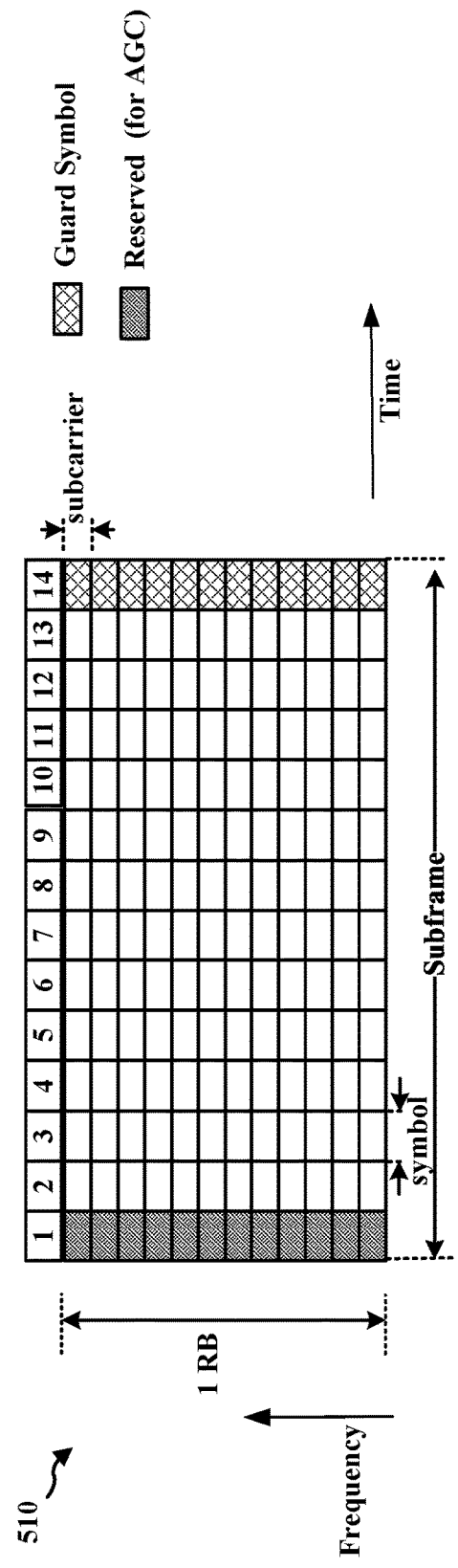

A first symbol of a subframe may be used for AGC convergence. Thus, LLRs for a first symbol may be set to 0. As the LLRs may be set to 0 for the first symbol, performance may be degraded similar to puncturing of the first symbol. In order to avoid such performance degradation, the transmitter may avoid including information in the first symbol of a subframe. If information is not included in the first symbol, the receiver does not fail to receive the information by setting the LLRs to zero in order to perform AGC. Therefore, aspects presented herein provide for rate matching based on the first symbol of a subframe. For example, the resource elements in the first symbol within a subframe may not be considered in the mapping process. FIG. 5B illustrates an example sidelink subframe 510 including 14 symbols including a last symbol that is a guard symbol and a first symbol that is reserved for AGC by a receiving device. For example, the first symbol of the subframe may be reserved by not considering the first symbol when mapping to resource elements of the subframe 510. The transmitting device may perform rate matching for the sidelink transmission (e.g., PSSCH or PSCCH) based on both the first symbol and the last symbol of the subframe so that the resource elements in both the first symbol and the last symbol of the subframe are not considered in the mapping process. Rate matching so that neither the first symbol nor the last symbol of a subframe is included in the mapping may help to improve coverage and coding gain for the sidelink transmission. Therefore, the rate matching may help to improve accurate reception of the sidelink transmission.

Figure 6:
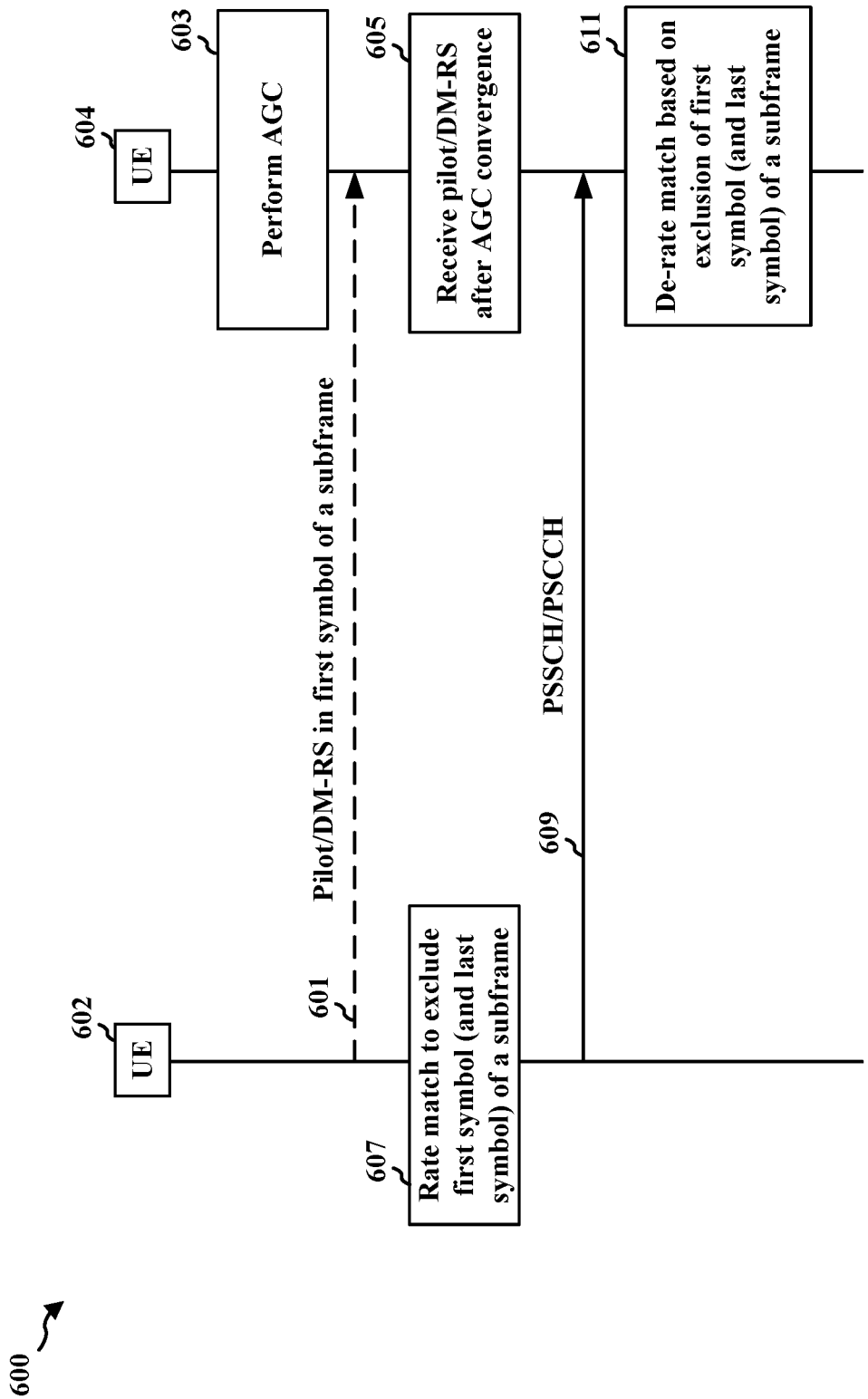
FIG. 6 is an example communication flow involving sidelink communication between a first device and a second device.

FIG. 6 illustrates an example communication flow 600 between a transmitting device transmitting sidelink communication and a receiving device receiving the sidelink communication. In FIG. 6, the transmitting device is UE 602, and the receiving device is UE 604. Both devices may be capable of transmission and reception based on sidelink. Although the example illustrates sidelink communication between two UEs, the concepts presented in FIG. 6 may be applied by other devices communicating based on sidelink.

As illustrated at 607, UE 602 rate matches a PSSCH transmission or a PSCCH transmission to exclude a first SC-FDMA symbol of a sidelink subframe. The rate matching may also exclude a last symbol of the subframe from the PSSCH/PSCCH transmission. Then, at 609, the UE 602 transmits the PSSCH transmission or the PSCCH transmission. The UE 604 receives the PSSCH/PSCCH transmission 609. In order to decode the PSSCH/PSCCH, the UE 604 performs de-rate matching, at 611, corresponding to the rate matching applied at 607 by the UE 602. Thus, the UE 604 performs the de-rate matching based on the exclusion of the first symbol from the resource element mapping when the PSSCH/PSCCH was generated by the UE 602. The de-rate matching performed by the UE 604 may also be based on the exclusion of the last symbol of the subframe.

In some examples, the UE 602 may transmit a signal 601 other than PSSCH/PSCCH in a first symbol of the subframe. As one non-limiting example, a UE may transmit a demodulation reference signal (DM-RS) in the first symbol of the subframe. DM-RS may be a sidelink physical signal that is used by the physical layer but does not carry information originating from higher layers. The UE may select a signal that may help the receiver perform AGC convergence more quickly in order to prepare to receive the data. For example, the UE 602 may select a signal having a constant envelope in a time domain or a quasi-constant envelope in the time domain. As an example, the UE 602 may use a Zadoff-Chu (ZC) based signal in the time domain or in the frequency domain having a constant envelope, or quasi-constant envelope, in the time domain. In some examples, a ZC sequence constant envelope feature may not be preserved due to Inverse Fast Fourier Transform (IFFT) of the signal after shortening (for example, when ZC is in the frequency domain) or due to oversampling (when ZC is in the time domain). A ZC in the frequency domain may be able to be the same as other DMRS's.

The UE 604 may use a part of the DMRS if the receiver is able to perform AGC convergence before the end of the first symbol. For example, the UE 604 may perform AGC, at 603, during a first symbol of a sidelink subframe. If the AGC converges before the end of the first symbol, the UE 604 may use the remaining duration of the DM-RS 601, at 605, to determine channel estimates. Thus, the UE 604 may use the signal 601 in the remaining duration of the first symbol, e.g., after performing AGC at 603. The UE 604 may use the channel estimates from the DM-RS for demodulation of the PSSCH/PSCCH in the subframe. As the UE 602 did not include PSSCH or PSCCH in the first symbol, if the AGC does not converge before the end of the first symbol, the UE 604 has not missed any data from the UE 602.

Figure 7:
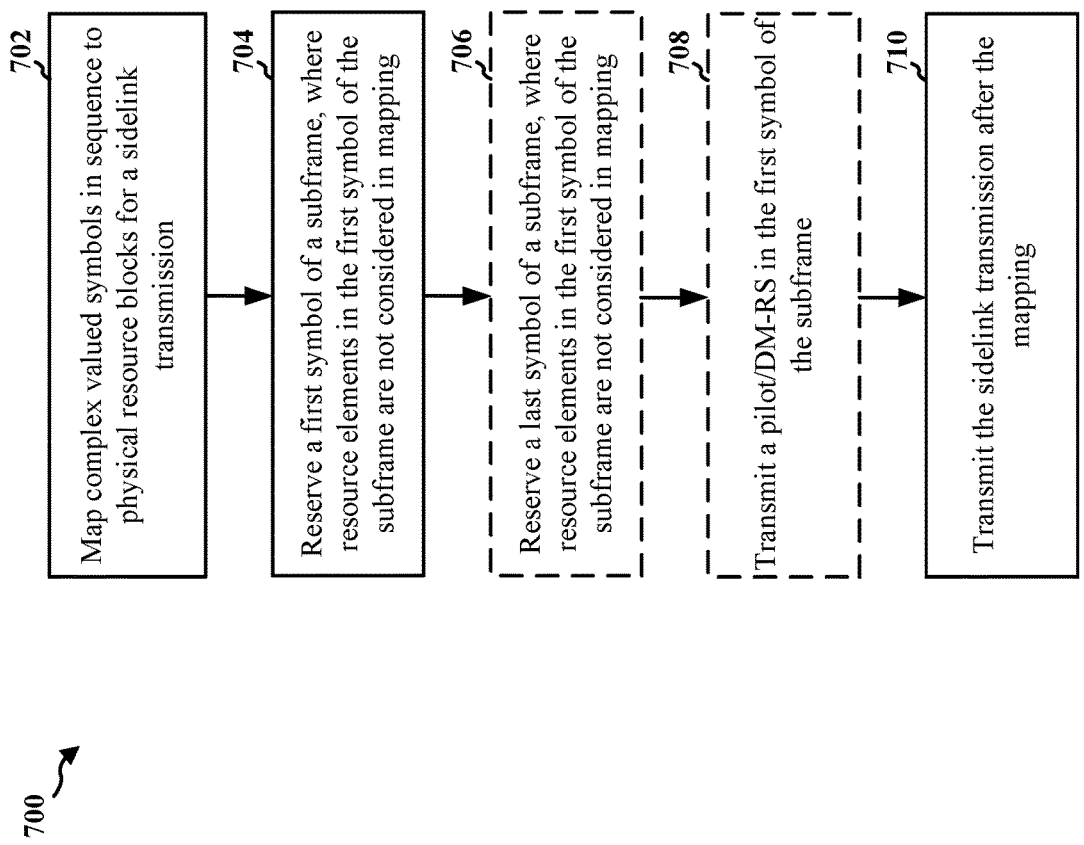
FIG. 7 is a flowchart of a method of wireless communication.

FIG. 7 is a flowchart 700 of a method of wireless communication. The method may be performed by a transmitting device (e.g., the 104, 602; the device 310; the apparatus 802/802'; the processing system 914, which may include memory and which may be an entire UE or a component of a UE). Optional aspects are illustrated with a dashed line. The method may help to improve performance of a receiving device through rate matching around a first symbol of a subframe that the receiving device uses to perform AGC.

At 702, the transmitting device maps complex valued symbols in sequence to physical resource blocks for a sidelink transmission. The mapping may be performed, e.g., by a map component 808 of the apparatus 802 in FIG. 8. The sidelink transmission may comprise PSSCH and/or PSCCH. Thus, the transmitting device may map the complex valued symbols in sequence to physical resource blocks for PSSCH. In another example, the transmitting device may map the complex valued symbols in sequence to physical resource blocks for PSCCH. The sidelink transmission may include a V2X transmission, such as a C-V2X transmission.

At 704, the transmitting device reserves a first symbol of a subframe. The resource elements in the first symbol of the subframe are not considered in mapping the complex valued symbols to the physical resource blocks for the sidelink transmission. For example, the resource elements in the first symbol are not used to map the complex valued symbols. Thus, the first symbol may be used for a pilot signal or a reference signal, and is not used for data or control. The reservation may be performed, e.g., by a first symbol component 810 of the apparatus 802 in FIG. 8. The subframe may comprise an SC-FDMA subframe, for example.

As illustrated at 706, the transmitting device may further reserve a last symbol of the subframe, wherein resource elements in the last symbol of the subframe are not considered in mapping the complex valued symbols to the physical resource blocks for the sidelink transmission. The reservation may be performed, e.g., by a last symbol component 812 of the apparatus 802 in FIG. 8.

As the first and/or the last symbol of the subframe are not considered in the mapping, the mapping the complex valued symbols to the physical resource blocks for the sidelink transmission may include rate matching around the first symbol of the subframe. The transmitting device may further rate match around the last symbol of the subframe. A TB size may be a function of a number of RBs. The number of RBs (e.g., #RBS) may be optimized and may change, e.g., may change from 0.8*#RBs to 0.6*#RBs. The examples of 0.8 and 0.6 are merely to illustrate the concept of changing a parameter number of RBs, e.g., for a TB size table. The concept of changing the number of RBs for determining a TB size, e.g., to optimize the number of RBs, may be applied using different values than the examples of 0.8 and 0.6. In other examples, the number of RBs may remain the same, e.g., 0.8*#RBs.

As illustrated at 708, the transmitting device may transmit a signal in the first symbol of the subframe. The signal may be a signal that will help the receiving device to perform AGC convergence in less time. The signal may include at least one of a pilot signal or a DM-RS. The signal may include a constant envelope in a time domain or a quasi-constant envelope in the time domain. For example, the signal may include a Zadoff-Chu signal. The transmission may be performed, e.g., by a signal component 814 and/or the transmission component 806 of the apparatus 802 in FIG. 8.

At 710, the transmitting device transmits the sidelink transmission after mapping the complex valued symbols to the physical resource blocks. The sidelink transmission may be transmitted in symbols other than a first symbol and a last symbol of a subframe, for example. The sidelink transmission may include a V2X transmission, such as a C-V2X transmission. The transmission may be performed, e.g., by the transmission component 806 of the apparatus 802 in FIG. 8.

Figure 8:
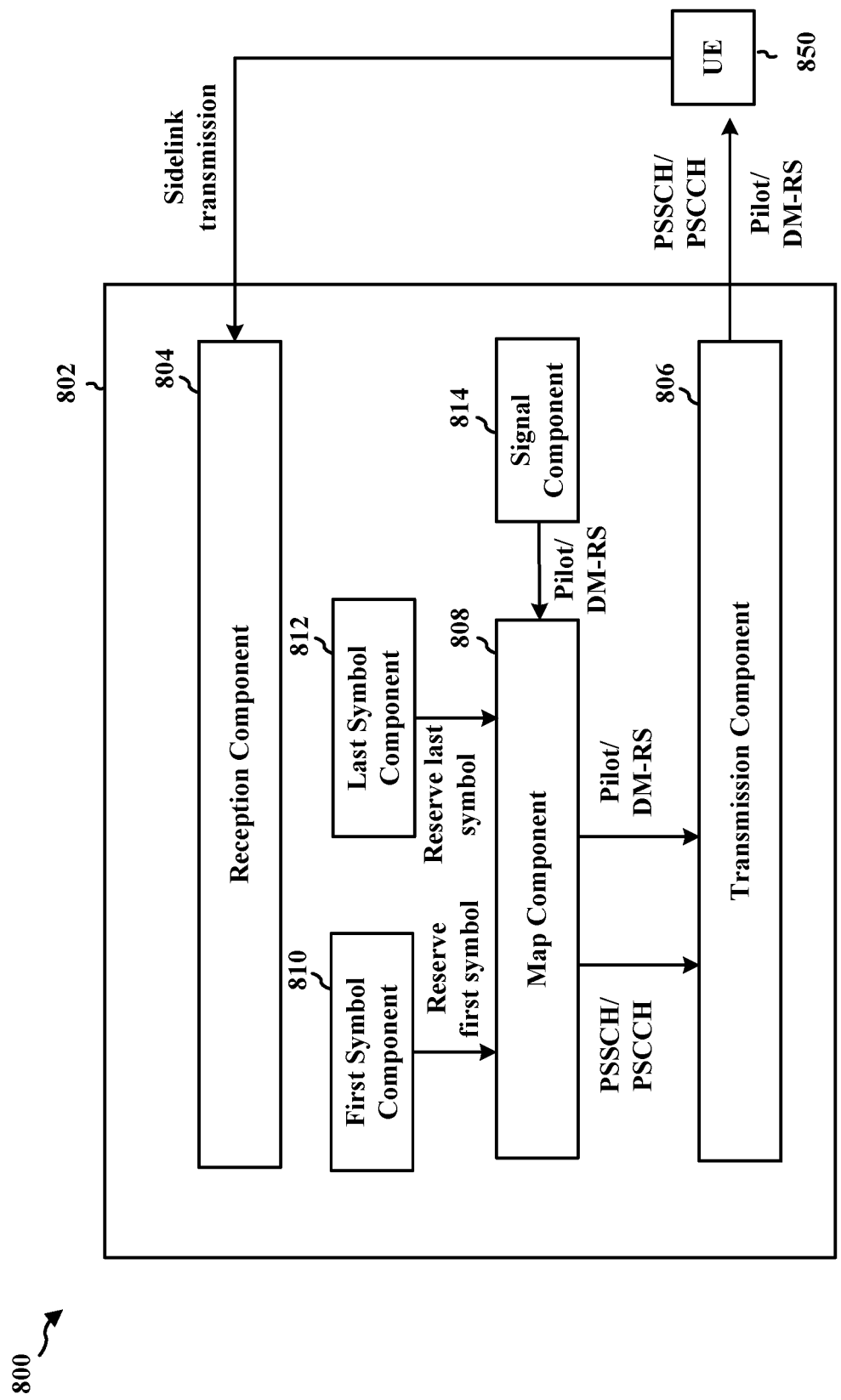
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a transmitting device or a component of a transmitting device. The transmitting device may be, for example a UE, an RSU or another device that is configured to transmit sidelink communication. The apparatus 802 includes a reception component 804 that is configured to receive sidelink communication, e.g., from UE 850, a transmission component 806 that is configured to transmit sidelink communication, e.g., to UE 850. The apparatus 802 includes a map component 808 that is configured to map complex symbols in sequence to physical resource blocks for a sidelink transmission, e.g., as described in connection with 702 in FIG. 7. The apparatus 802 includes a first symbol component 810 that is configured to reserve a first symbol of a subframe, where resource elements in the first symbol of the subframe are not considered in mapping the complex valued symbols to the physical resource blocks for the sidelink transmission, e.g., as described in connection with 704 in FIG. 7. The apparatus may include a last symbol component 812 that is configured to reserve a last symbol of a subframe, where resource elements in the last symbol of the subframe are not considered in mapping the complex valued symbols to the physical resource blocks for the sidelink transmission, e.g., as described in connection with 706 in FIG. 7. The apparatus may include a signal component 814 that is configured to transmit a signal in the first symbol of the subframe, such as a pilot signal or a DM-RS, e.g., as described in connection with 708 in FIG. 7. The transmission component 806 is configured to transmit the sidelink transmission after mapping the complex valued symbols to the physical resource blocks, e.g., as described in connection with 710 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. As the apparatus may also be a receiving device, the apparatus may include the additional components described in connection with FIG. 11. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
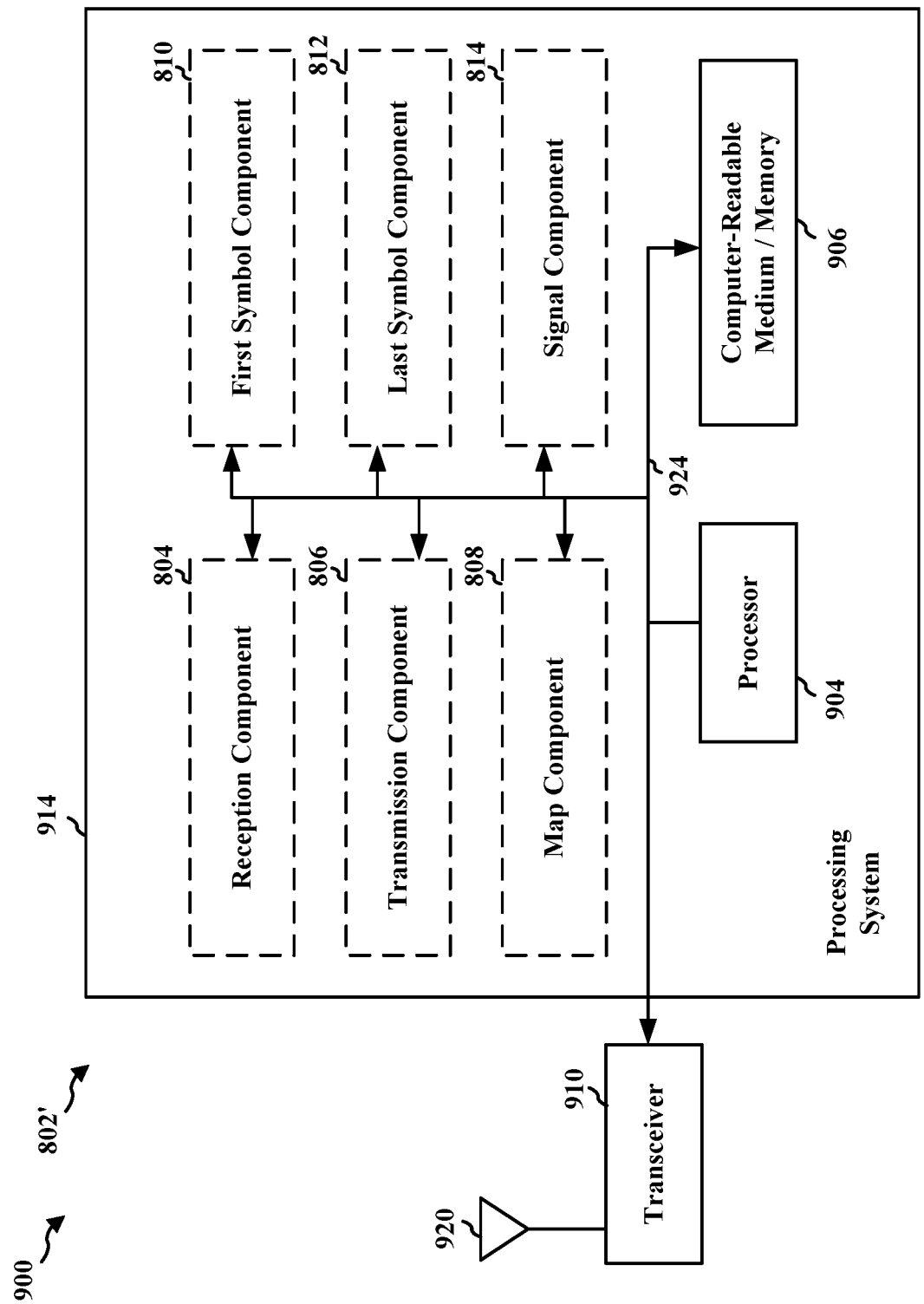
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814. The components may be software components running in the processor 904, resident/stored in the computer readable medium/memory 906, one or more hardware components coupled to the processor 904, or some combination thereof. The processing system 914 may be a component of the device 310 or the device 350 and may include the memory 376, 360 and/or at least one of the TX processor 316, 368, the RX processor 370, 356, and the controller/processor 375, 359. Alternatively, the processing system 914 may be the entire device (e.g., see device 310 or 350 of FIG. 3).

In one configuration, the apparatus 802/802' for wireless communication includes means for mapping complex valued symbols in sequence to physical resource blocks for a sidelink transmission and means for reserving a first symbol of a subframe, where resource elements in the first symbol of the subframe are not considered in mapping of the complex valued symbols to the physical resource blocks for the sidelink transmission. The apparatus 802/802' includes means for transmitting the sidelink transmission after mapping the complex valued symbols to the physical resource blocks. The apparatus 802/802' may further include means for reserving a last symbol of the subframe, wherein resource elements in the last symbol of the subframe are not considered in mapping the complex valued symbols to the physical resource blocks for the sidelink transmission. The apparatus 802/802' may further include means for transmitting a signal in the first symbol of the subframe, wherein the signal includes at least one of a pilot signal or a DM-RS. The aforementioned means may be one or more of the aforementioned components of the apparatus 802 and/or the processing system 914 of the apparatus 802' configured to perform the functions recited by the aforementioned means. As described supra, the processing system 914 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 10:
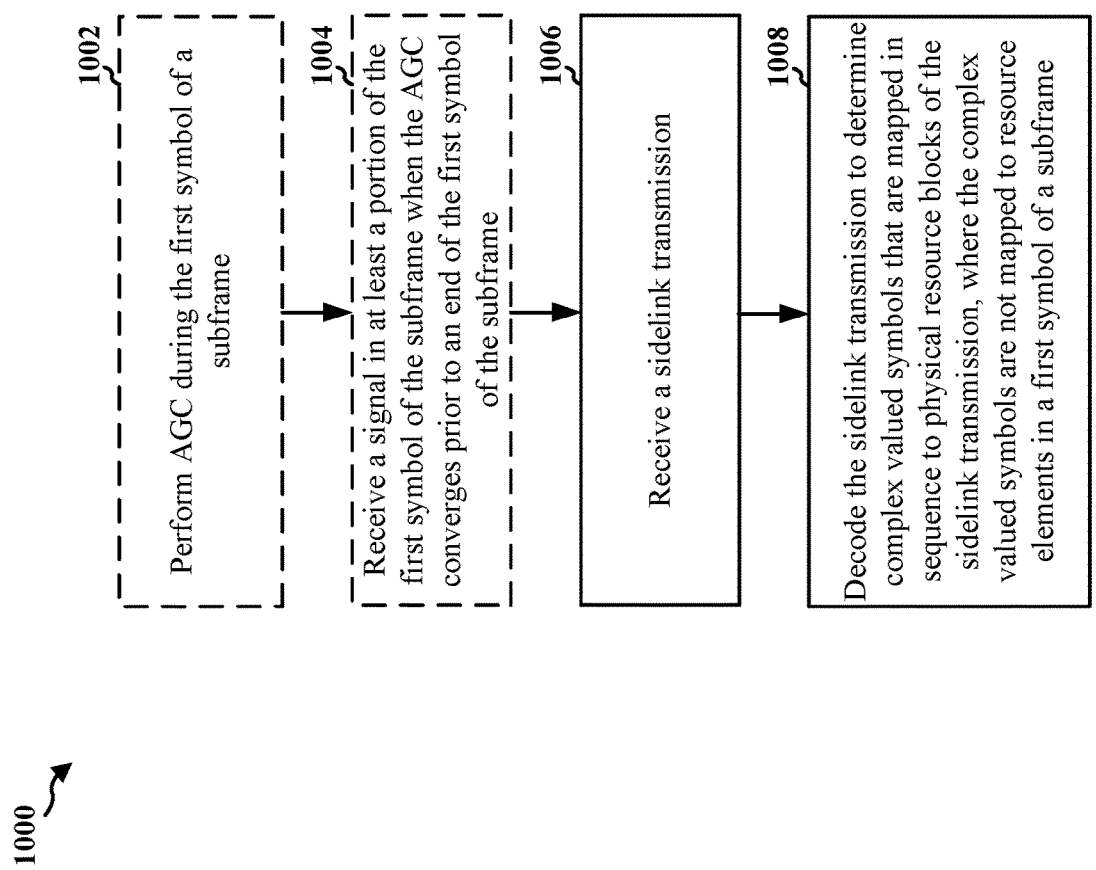
FIG. 10 is a flowchart of a method of wireless communication.

FIG. 10 is a flowchart 1000 of a method of wireless communication. The method may be performed by a receiving device (e.g., the UE 104, 604; the device 350; the apparatus 1102/1102'; the processing system 1214, which may include memory and which may be an entire UE or a component of a UE). Optional aspects are illustrated with a dashed line. The method may help improve performance of the receiving device through rate matching around a first symbol of a subframe that the receiving device uses to perform AGC.

At 1006, the receiving device receives a sidelink transmission. The reception may be performed, e.g., by the reception component 1104 of the apparatus 1102 in FIG. 11. The sidelink transmission may comprise a PSSCH and/or PSCCH. The sidelink transmission may include a V2X transmission, such as a C-V2X transmission.

At 1008, the receiving device decodes the sidelink transmission to determine complex valued symbols that are mapped in sequence to physical resource blocks of the sidelink transmission, where the complex valued symbols are not mapped to resource elements in a first symbol of a subframe. The subframe may comprise an SC-FDMA subframe, for example. The decoding may be performed, e.g., by the decode component 1108 of the apparatus 1102 in FIG. 11. In some examples, the complex valued symbols may also not be mapped to the resource elements in a last symbol of the subframe. Decoding the sidelink transmission may include performing de-rate matching around the first symbol of the subframe and the last symbol of the subframe. For example, the receiving device may decode a PSSCH by de-rate matching around a first symbol and a last symbol of a subframe. In another example, the receiving device may decode a PSCCH by de-rate matching around a first symbol and a last symbol of a subframe.

In some examples, as illustrated at 1002, the receiving device may perform AGC during the first symbol of the subframe. The AGC may be performed prior to receiving the PSSCH/PSCCH, at 1006. The AGC may be performed, e.g., by the AGC component 1110 of the apparatus 1102 n FIG. 11.

Then, as illustrated at 1004, the receiving device may receive a signal in at least a portion of the first symbol of the subframe when the AGC converges prior to an end of the first symbol of the subframe. The signal may be a signal that assists the receiving device in performing AGC convergence in less time. In an example, the signal may include a constant envelope in a time domain or a quasi-constant envelope in the time domain. The signal may include a pilot signal or a DM-RS. The reception of the signal may be performed, e.g., by the signal component 1112 of the apparatus 1102 n FIG. 11.

Figure 11:
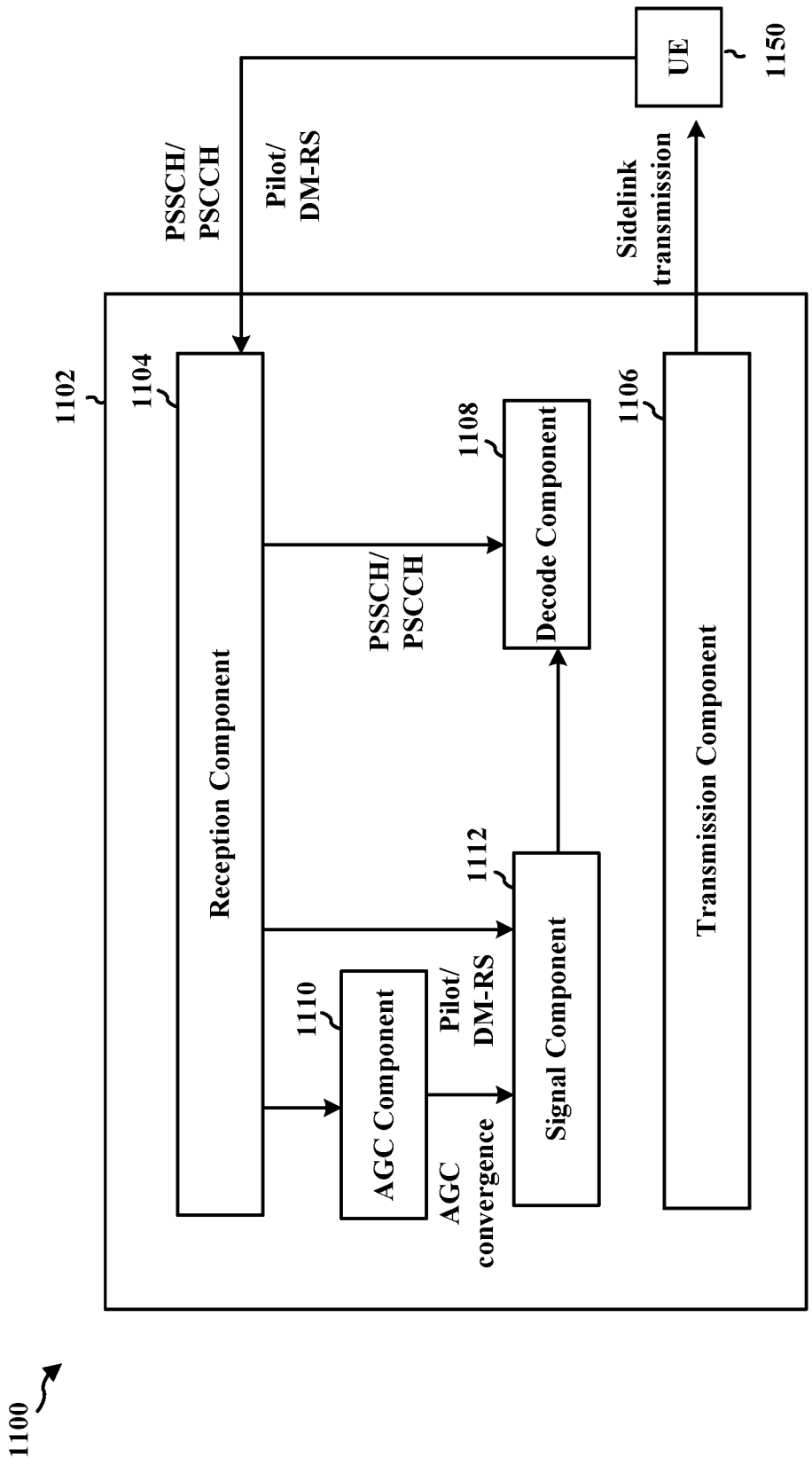
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a receiving device or a component of a receiving device, e.g., UE, an RSU, or another device configured to receive sidelink communication. The apparatus 1102 includes a reception component 1104 configured to a sidelink transmission, e.g., as described in connection with 1006 in FIG. 10. The apparatus 1102 includes a decode component 1108 configured to decode the sidelink transmission to determine complex valued symbols that are mapped in sequence to physical resource blocks of the sidelink transmission, where the complex valued symbols are not mapped to resource elements in a first symbol of a subframe, e.g., as described in connection with 1008 in FIG. 10. The decode component 1108 may be configured to perform de-rate matching around the first symbol of the subframe and the last symbol of the subframe. The apparatus 1102 may further include an AGC component 1110 configured to perform AGC during the first symbol of the subframe, e.g., as described in connection with 1002 in FIG. 10. The apparatus 1102 may further include a signal component 1112 configured to receive a signal in at least a portion of the first symbol of the subframe when the AGC converges prior to an end of the first symbol of the subframe, e.g., as described in connection with 1004 in FIG. 10. The apparatus 1102 may include a transmission component 1106 configured to transmit sidelink communication, e.g., to the UE 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. In some aspects, the apparatus 1102 may be configured to also transmit sidelink communication. Therefore, the apparatus 1102 may further include the components described in connection with 802. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
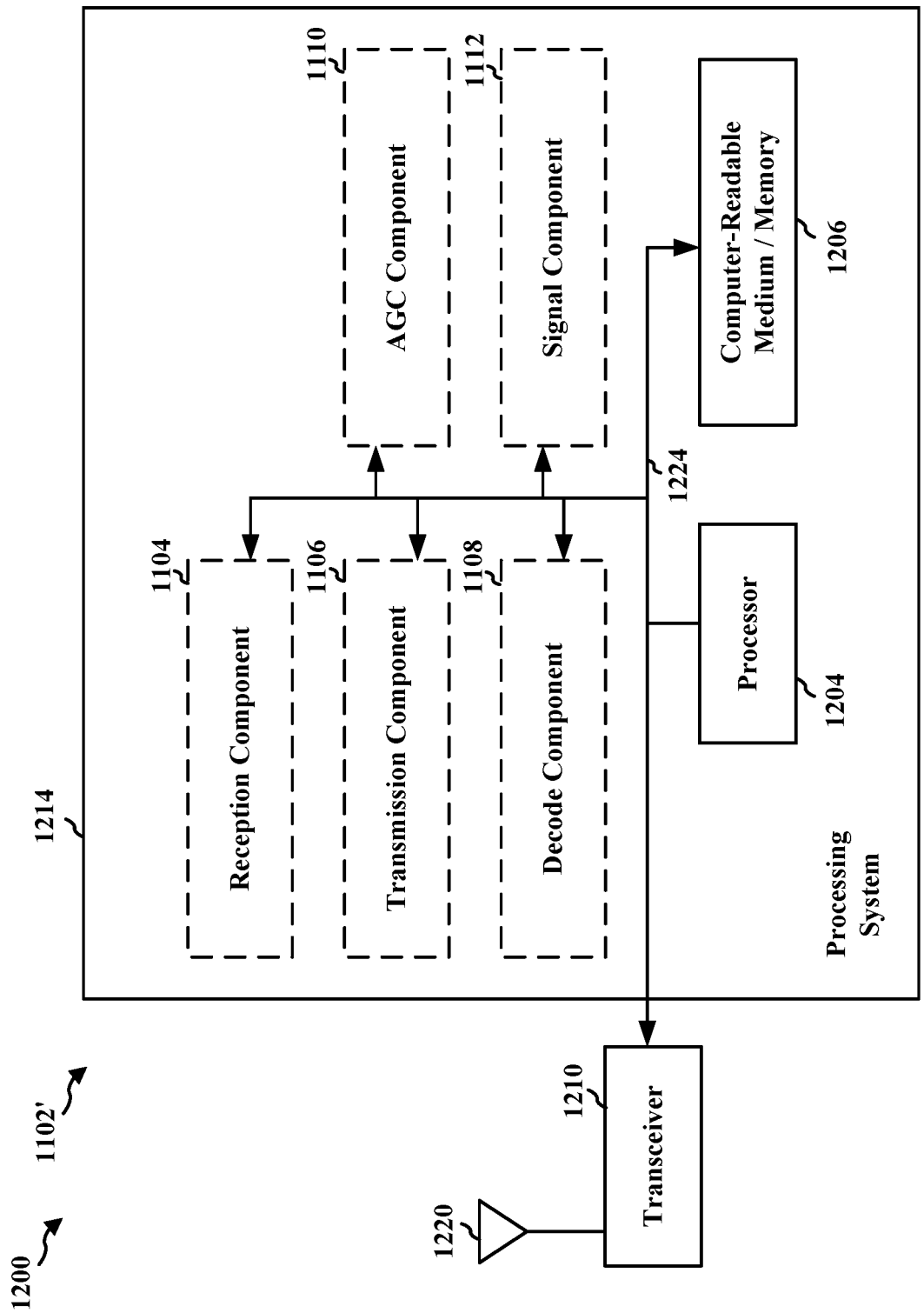
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the device 310 or the device 350 and may include the memory 376, 360 and/or at least one of the TX processor 316, 368, the RX processor 370, 356, and the controller/processor 375, 359. Alternatively, the processing system 1214 may be the entire device (e.g., see device 310 or 350 of FIG. 3).

In one configuration, the apparatus 1102/1102' for wireless communication includes means for receiving a sidelink transmission; and means for decoding the sidelink transmission to determine complex valued symbols that are mapped in sequence to physical resource blocks of the sidelink transmission, wherein the complex valued symbols are not mapped to resource elements in a first symbol of a subframe. The means for decoding the sidelink transmission may be configured to perform de-rate matching around the first symbol of the subframe and the last symbol of the subframe. The apparatus 1102/1102' may further include means for performing AGC during the first symbol of the subframe. The apparatus 1102/1102' may further include means for receiving a signal in at least a portion of the first symbol of the subframe when the AGC converges prior to an end of the first symbol of the subframe. The aforementioned means may be one or more of the aforementioned components of the apparatus 1102 and/or the processing system 1214 of the apparatus 1102' configured to perform the functions recited by the aforementioned means. As described supra, the processing system 1214 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

The following examples are illustrative only and aspects thereof may be combined with aspects of other examples or teaching described herein, without limitation.

Example 1 is a method of wireless communication at a transmitting device, comprising: mapping complex valued symbols in sequence to physical resource blocks for a sidelink transmission; reserving a first symbol of a subframe, wherein resource elements in the first symbol of the subframe are not considered in mapping the complex valued symbols to the physical resource blocks for the sidelink transmission; and transmitting the sidelink transmission after mapping the complex valued symbols to the physical resource blocks.

In Example 2, the method of Example 1 further includes reserving a last symbol of the subframe, wherein resource elements in the last symbol of the subframe are not considered in mapping the complex valued symbols to the physical resource blocks for the sidelink transmission.

In Example 3, the method of Example 1 or Example 2 further includes that mapping the complex valued symbols to the physical resource blocks for the sidelink transmission includes rate matching around the first symbol of the subframe and the last symbol of the subframe.

In Example 4, the method of any of Examples 1-3 further includes that the subframe comprises a SC-FDMA subframe and the sidelink transmission comprises at least one of a PSSCH or a PSCCH.

In Example 5, the method of any of Examples 1-4 further includes transmitting a signal in the first symbol of the subframe, wherein the signal includes at least one of a pilot signal or a DM-RS.

In Example 6, the method of any of Examples 1-5 further includes that the signal comprises a constant envelope in a time domain or a quasi-constant envelope in the time domain.

Example 7 is a device including one or more processors and one or more memories in electronic communication with the one or more processors storing instructions executable by the one or more processors to cause the device to implement a method as in any of Examples 1-6.

Example 8 is a system or apparatus including means for implementing a method or realizing an apparatus as in any of Examples 1-6.

Example 9 is a non-transitory computer readable medium storing instructions executable by one or more processors to cause the one or more processors to implement a method as in any of Examples 1-6.

Example 10 is a method of wireless communication at a receiving device, comprising: receiving a sidelink transmission; and decoding the sidelink transmission to determine complex valued symbols that are mapped in sequence to physical resource blocks of the sidelink transmission, wherein the complex valued symbols are not mapped to resource elements in a first symbol of a subframe.

In Example 11, the method of Example 10 further includes that the complex valued symbols are not mapped to the resource elements in a last symbol of the subframe.

In Example 12, the method of Example 10 or Example 11 further includes that decoding the sidelink transmission includes performing de-rate matching around the first symbol of the subframe and the last symbol of the subframe.

In Example 13, the method of any of Examples 10-12 further includes that the subframe comprises a SC-FDMA subframe and the sidelink transmission comprises at least one of a PSSCH or a PSCCH.

In Example 14, the method of any of Examples 10-13 further includes performing AGC during the first symbol of the subframe.

In Example 15, the method of any of Examples 10-14 further includes receiving a signal in at least a portion of the first symbol of the subframe when the AGC converges prior to an end of the first symbol of the subframe.

In Example 16, the method of any of Examples 10-15 further includes that the signal comprises a constant envelope in a time domain or a quasi-constant envelope in the time domain.

In Example 17, the method of any of Examples 10-16 further includes that the signal includes a pilot signal or a DM-RS.

Example 18 is a device including one or more processors and one or more memories in electronic communication with the one or more processors storing instructions executable by the one or more processors to cause the device to implement a method as in any of Examples 10-17.

Example 19 is a system or apparatus including means for implementing a method or realizing an apparatus as in any of Examples 10-17.

Example 20 is a non-transitory computer readable medium storing instructions executable by one or more processors to cause the one or more processors to implement a method as in any of Examples 10-17.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a receiving device, comprising:
   one or more memories; and
   at least one processor coupled to the one or more memories and configured to:
      perform automatic gain control during a first symbol of a subframe, wherein the automatic gain control converges prior to an end of the first symbol of the subframe;
      receive a pilot signal or a demodulation reference signal (DM-RS) during the first symbol based on the automatic gain control converging prior to the end of the first symbol of the subframe, wherein the pilot signal or the DM-RS spans an entire first symbol of the subframe;
      receive at least a portion of a sidelink transmission during the subframe; and
      decode the sidelink transmission to determine complex valued symbols that are mapped in sequence to physical resource blocks of the sidelink transmission, wherein the complex valued symbols are not mapped to resource elements in the first symbol of the subframe.

2. The apparatus of claim 1, wherein the complex valued symbols are not mapped to the resource elements in a last symbol of the subframe.

3. The apparatus of claim 2, wherein the at least one processor is further configured to perform de-rate matching around the first symbol of the subframe and the last symbol of the subframe.

4. The apparatus of claim 1, wherein the subframe comprises a single carrier frequency division multiple access (SC-FDMA) subframe and the sidelink transmission comprises at least one of a physical sidelink shared channel (PSSCH) or a physical sidelink control channel (PSCCH).

5. The apparatus of claim 1, wherein the pilot signal or the DM-RS comprises a constant envelope in a time domain or a quasi-constant envelope in the time domain.

6. A method of wireless communication at a receiving device, comprising:
    performing automatic gain control during a first symbol of a subframe, wherein the automatic gain control converges prior to an end of the first symbol of the subframe;
    receiving a pilot signal or a demodulation reference signal (DM-RS) during the first symbol based on the automatic gain control converging prior to the end of the first symbol of the subframe, wherein the pilot signal or the DM-RS spans an entire first symbol of the subframe;
    receiving at least a portion of a sidelink transmission during the subframe; and
    decoding the sidelink transmission to determine complex valued symbols that are mapped in sequence to physical resource blocks of the sidelink transmission, wherein the complex valued symbols are not mapped to resource elements in the first symbol of the subframe.

7. The method of claim 6, wherein the complex valued symbols are not mapped to the resource elements in a last symbol of the subframe.

8. The method of claim 7, wherein decoding the sidelink transmission includes performing de-rate matching around the first symbol of the subframe and the last symbol of the subframe.

9. The method of claim 6, wherein the subframe comprises a single carrier frequency division multiple access (SC-FDMA) subframe and the sidelink transmission comprises at least one of a physical sidelink shared channel (PSSCH) or a physical sidelink control channel (PSCCH).

10. The method of claim 6, wherein the pilot signal or the DM-RS comprises a constant envelope in a time domain or a quasi-constant envelope in the time domain.

11. An apparatus for wireless communication at a receiving device, comprising:
    means for performing automatic gain control during a first symbol of a subframe, wherein the automatic gain control converges prior to an end of the first symbol of the subframe;
    means for receiving a pilot signal or a demodulation reference signal (DM-RS) during the first symbol based on the automatic gain control converging prior to the end of the first symbol of the subframe, wherein the pilot signal or the DM-RS spans an entire first symbol of the subframe;
    means for receiving at least a portion of a sidelink transmission during the subframe; and
    means for decoding the sidelink transmission to determine complex valued symbols that are mapped in sequence to physical resource blocks of the sidelink transmission, wherein the complex valued symbols are not mapped to resource elements in the first symbol of the subframe.

12. The apparatus of claim 11, wherein the complex valued symbols are not mapped to the resource elements in a last symbol of the subframe.

13. The apparatus of claim 12, wherein the means for decoding the sidelink transmission are configured to perform de-rate matching around the first symbol of the subframe and the last symbol of the subframe.

14. The apparatus of claim 11, wherein the subframe comprises a single carrier frequency division multiple access (SC-FDMA) subframe and the sidelink transmission comprises at least one of a physical sidelink shared channel (PSSCH) or a physical sidelink control channel (PSCCH).

15. The apparatus of claim 11, wherein the the pilot signal or the DM-RS comprises a constant envelope in a time domain or a quasi-constant envelope in the time domain.

16. A non-transitory computer-readable medium storing computer executable code at a receiving device, the code when executed by a processor causes the processor to:
    perform automatic gain control during a first symbol of a subframe, wherein the automatic gain control converges prior to an end of the first symbol of the subframe;
    receive a pilot signal or a demodulation reference signal (DM-RS) during the first symbol based on the automatic gain control converging prior to the end of the first symbol of the subframe, wherein the pilot signal or the DM-RS spans an entire first symbol of the subframe;
    receive at least a portion of a sidelink transmission during the subframe; and
    decode the sidelink transmission to determine complex valued symbols that are mapped in sequence to physical resource blocks of the sidelink transmission, wherein the complex valued symbols are not mapped to resource elements in the first symbol of the subframe.

17. The non-transitory computer-readable medium of claim 16, wherein the complex valued symbols are not mapped to the resource elements in a last symbol of the subframe.

18. The non-transitory computer-readable medium of claim 17, further comprising code, which when executed by the processor causes the processor to:
    perform de-rate matching around the first symbol of the subframe and the last symbol of the subframe.

19. The non-transitory computer-readable medium of claim 16, wherein the subframe comprises a single carrier frequency division multiple access (SC-FDMA) subframe and the sidelink transmission comprises at least one of a physical sidelink shared channel (PSSCH) or a physical sidelink control channel (PSCCH).

20. The non-transitory computer-readable medium of claim 16, wherein the pilot signal or the DM-RS comprises a constant envelope in a time domain or a quasi-constant envelope in the time domain.

* * * * *